United States Patent Office 3,157,680
Patented Nov. 17, 1964

3,157,680
PREPARATION OF 16-ALKYL-16-DEHYDRO-PREGNENOLONE
Robert Philip Graber and LeRoy George Hickman, Minneapolis, Minn., assignors to General Mills, Inc., a corporation of Delaware
No Drawing. Filed May 14, 1962, Ser. No. 194,696
2 Claims. (Cl. 260—397.4)

This invention relates to a novel process for the preparation of 16-alkyl-16-dehydropregnenolone and the corresponding acylates thereof via new and novel intermediates, and in particular, to the preparation of 16-methyl-16-dehydropregnenolone and the corresponding acetate esters.

16-methyl-16-dehydropregnenolone and its corresponding acetate are well known compounds in the steroid literature, having known utility as intermediates for the preparation of 16β-methylated progestational agents, corticoids, etc. For example, the 16-methyl-16-dehydropregnenolone compounds may be catalytically hydrogenated to provide the 16β-methyl-pregnenolone compounds which may be oxidized to 16β-methylprogesterone. They may also be epoxidized by well known procedures to the valuable 16β-methyl-16α,17α-oxido compounds or to the 16β-methyl-5α,6α:16α,17α-dioxido compounds.

In accordance with the publication of Wettstein, Helv. Chim. Acta, 27, 1803 (1944), these may be prepared by way of the following sequence of reactions:

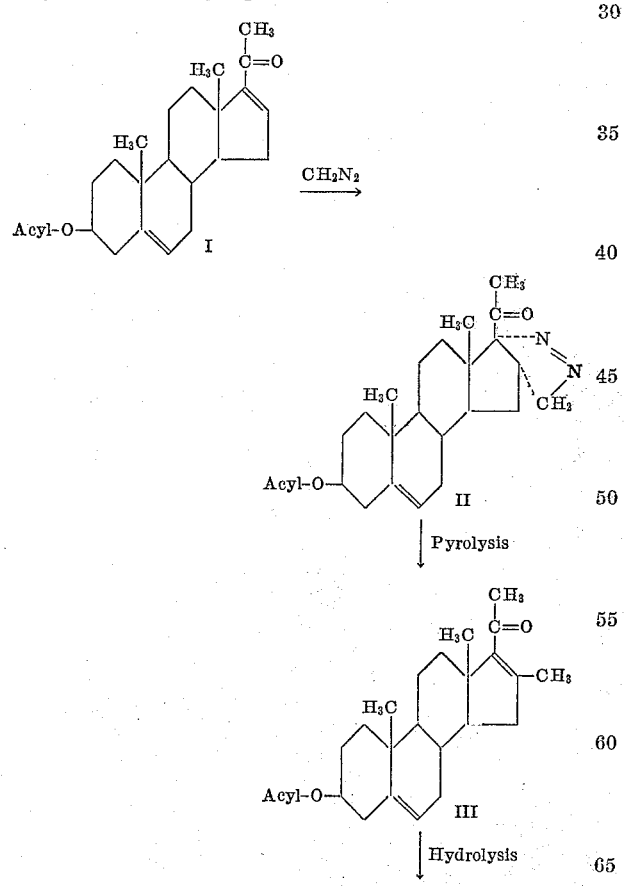

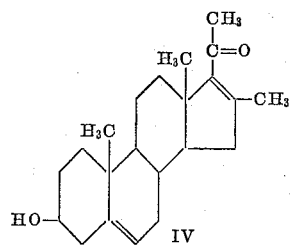

A 16-dehydropregnenolone acylate (I) is treated with diazomethane in a suitable solvent or solvent mixture to form a 16α,17α-pyrazolino compound (II). Thermal decomposition of this intermediate pyrazoline affords a mixture of the desired 16-methyl-16-dehydropregnenolone acylate (III) together with at least two isomeric by-products.

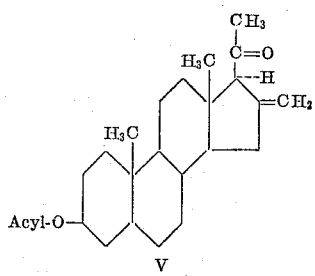

and

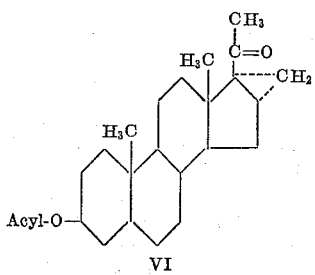

The desired compound (III) must be separated by fractional crystallization from these isomeric by-products. Thus the known process suffers from two disadvantages. One, the process requires the preparation and use of the extremely toxic and explosive compound, diazomethane. Two, the desired compound (III) is formed as a complex mixture with at least two isomeric products (V and VI). In addition, the process is substantially limited from an economic standpoint to the preparation of the methyl and ethyl compounds as diazoalkanes other than diazomethane and diazoethane are difficult and expensive to prepare.

A method has now been discovered which avoids the disadvantages of the above described process. This novel method does not involve the use of hazardous or explosive reagents such as diazomethane, and further, affords a means of economically preparing compounds in which the alkyl group may vary widely.

It is therefore an object of this invention to provide a method of preparation of 16-alkyl-16-dehydropregnenolone and the acylates thereof.

It is also an object of this invention to provide novel intermediates in the preparation of the 16-alkyl-16-dehydropregnenolone and the corresponding acylates thereof.

Other objects and advantages will be apparent from the following description.

The starting material for the present invention is 16-dehydropregnenolone-3-acylate. The present process proceeds by way of the following sequence of reactions in which R is hydrogen or an acyl group, R' is an alkyl group having from 1 to 8 carbon atoms, R'' is an acyl group and the acyl groups of R and R' may take the form $$R'''-\overset{O}{\underset{\|}{C}}-$$

where R''' is an aliphatic hydrocarbon group having from 1 to 11 carbon atoms and X is a halogen atom. Illustrative ester groups are the acetate, propionate, caproate and the like. Illustrative alkyl groups are methyl, ethyl, butyl, hexyl and octyl and the like. Illustrative halogen atoms are Cl, Br and I.

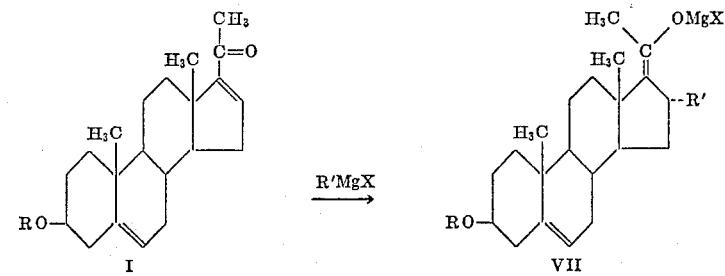

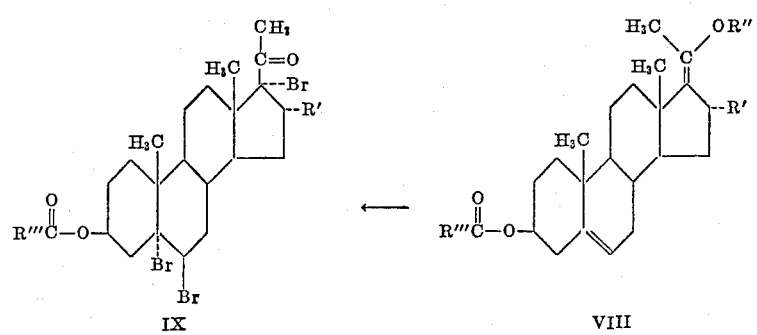

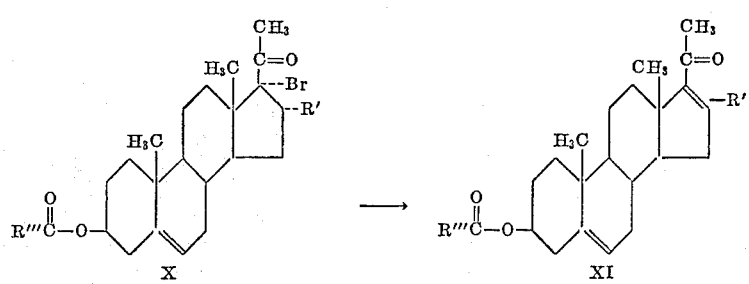

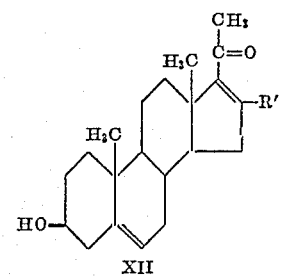

Briefly, the process in the foregoing reaction sequence is as follows:

The 16-dehydropregnenolone 3-acylate (Ia) or 3-alcohol (Ib) is treated with an alkyl Grignard reagent in the presence of cuprous chloride. The Grignard reagent adds to the $\Delta^{16}$-20-ketone system to give a 16α-alkyl-$\Delta^{17(20)}$-enol Grignard complex (VII) which is treated with an acylating agent to produce a 16α-alkyl-$\Delta^{17(20)}$-enol acylate (VIII). Bromination of the enol acylate then produces the 5α,6β,17α-tribromopregnanolone (IX) with concomitant collapse of the enol acetate system to the 20-ketone system. The tribromide is then debrominated to give the 17α-monobromide (X) which may be dehydrobrominated to form the desired 16 - alkyl - 16 - dehydropregnenolone acylate (XI). In place of bromination, chlorination may be conducted followed by subsequent dechlorination, and dehydrochlorination, thereby providing the corresponding chloroderivatives of (IX) and (X). In addition, if the 3-alcohol derivatives of compounds IX and X are desired, the 3-acylate derivatives may be hydrolyzed in the usual manner, preferably under acid conditions, to the corresponding 3-alcohol. The 3-acylate (XI) may be converted in the usual manner to the 3-hydroxy compound XII, as shown, if desired.

For purposes of simplicity of illustration, the process and compounds provided thereby will be discussed in detail below and in the examples, with reference to the methyl compounds, the bromo derivatives and the acetate esters, but it is hereby understood that this is merely illustrative of the process and products of the present invention and is not to be construed as limiting the invention.

(1) *Grignard alkylation and enol acylation of a 5,16-pregnadien-3β-ol-20-one 3-acylate or 3-alcohol (I).*—Treatment of the above $\Delta^{16}$-dehydro-20-ketone compounds with an alkyl Grignard reagent produces an intermediate 16α-alkylated Grignard complex (VII) which, without isolation, is treated in situ with an acylating agent. There is thus produced a mixture of the cis and trans forms of a 16α-alkyl-5,17(20)-pregnadiene-3β,20-diacylate (VIII). If the 3-acylate I is employed, the product will have the same or different acyl groups at the 3- and 20-positions, depending upon the acylating agent used. If, however, the 3-alcohol (I) is employed, the 3- and 20-acyl groups will of necessity be the same.

The reaction is normally carried out with about 2.4 moles of methyl magnesium bromide per mole of $\Delta^{16}$-dehydro-20-ketone. At little as 1.4 moles per mole of steroid may be employed. Ratios of greater than 2.4 moles per mole of steroid may be used but no increased beneficial effect is obtained thereby. Other alkyl magnesium bromides may be employed to give other 16-alkylated compounds. Alkyl magnesium iodides and dialkyl magnesium compounds may also be used. The 1,4-addition of the Grignard reagent to the α,β-unsaturated ketone system is catalyzed by the addition of cuprous chloride. Normally the salt is added in a ratio of about 0.1 mole per mole of steroid; somewhat lesser ratios are substantially as effective, but larger ratios show no increased beneficial effect. Other cuprous halides may also be employed such as cuprous iodide or cuprous bromide. The solvent normally used is tetrahydrofuran. However, mixtures of ether and tetrahydrofuran or dioxane and tetrahydrofuran may also be employed but the results are less satisfactory.

The reaction is normally carried out under an inert atmosphere such as nitrogen gas for a period of about 1-5 hours at about 25° C. Lower temperatures may be used but then longer reaction times are required. Somewhat higher temperatures and shorter times may also be employed but in these cases some attack of the Grignard reagent on the 3-ester function, if present, is observed.

After the termination of the Grignard alkylation period, the intermediate Grignard complex is acylated at about 25° C. by addition of a solution of an acylating agent. The acylating agents normally employed are acetyl chloride or acetic anhydride, usually diluted with a solvent such as tetrahydrofuran. Other acylating agents may be used such as propionyl chloride, propionic anhydride, butyryl chloride, butyric anhydride, and the like. After the acylating agent has been introduced, the mixture is allowed to stir for a period of about 45 minutes when acid chlorides are used, or for several hours when acid anhydrides are used.

The reaction mixture is finally treated with saturated aqueous ammonium chloride solution to decompose the excess Grignard reagent and excess acylating agent. Other ammonium salts may be used and even water alone may be used followed by careful acidification with, for example, hydrochloric acid. The solvent layer is diluted with ethyl acetate, separated from the aqueous layer, and washed free of inorganic and other water soluble materials. Other water-immiscible solvents may be used such as ethyl ether, methylene chloride and the like. After drying, the solvents are removed in vacuo to give the crude 16-alkylated product as a mixture of cis and trans isomeric forms of a 16α-alkyl-5,17(20)-pregnadiene-3β,20-diol 3β,20-diacylate (VIII). In practice, since both isomeric forms give the subsequent desired product, they are used without separation. The presence of the desired functionality is indicated by the characteristic infrared spectrum.

(2) *Bromination of a 16α-alkyl-5,17(20)-pregnadiene-3β, 20-diol 3β,20-diacylate (VIII).*—The bromination of the dienediol diacylate (VIII) is normally carried out in glacial acetic acid solution at room temperature. About 20–25 parts of glacial acetic acid are used per part of steroid. The bromine is added as a solution in glacial acetic acid over a period of about one hour. About 1.9–2.0 moles of bromine per mole of steroid are normally employed.

The tribromide is isolated by diluting the reaction mixture with 8–10 volumes of water. The product precipitates and is removed by filtration. After thorough washing with water, the crude product is carefully dried to avoid thermal decomposition. The 5α,6β,17α - tribromo - 16α-alkylpregnane-3-β-ol-20-one 3β-acylate (IX) may be purified by crystallization from methanol, ethanol, ether or other similar solvents, if desired, but is normally used without purification.

(3) *Debromination of 5α,6β,17α-tribromo-16α-alkylpregnane-3β-ol-20-one 3-acylate (IX).*—The tribromide is debrominated at positions 5 and 6 by treatment with sodium iodide in benzene-ethanol solution. The $\Delta^5$-double bond is thereby re-established without effecting the 17α-bromo-20-ketone system.

About 15–20 parts of benzene and 15–20 parts of ethanol are employed together with about 3 parts of sodium iodide. The mixture of the steroid with the other components is stirred at room temperature for about 24 hours, then diluted with about an equal volume of 2.5% aqueous sodium thiosulfate solution to remove the liberated iodine. The layers are separated, the aqueous layer extracted further with ethyl acetate, the solvent layers combined, washed thoroughly to remove inorganic materials, dried and evaporated to a small volume. The concentrated solution is diluted with several volumes of methanol, concentrated somewhat and allowed to stand at 0–5° overnight. The crystals which separate are removed by filtration, washed with cold methanol and dried at room temperature. In this manner, the 17α-bromo-16α-alkyl-5-pregnene-3β-ol-20-one 3-acylate (X) is obtained. The material is normally carried on without further purification but it may be purified by crystalization in the usual fashion.

Additional amounts of X may be obtained by treatment of the mother liquor residues with sodium bisulfite in a benzene-ether-water mixture. After re-isolation, crystallization as above affords material identical to that above.

(4) *Dehydrobromination of 17α-bromo-16α-alkyl-5-pregnene-3β-ol-20-one 3-acylates* (X).—Removal of the elements of hydrogen bromide from the 17α-bromo compound affords the desired 16-alkyl-16-dehydropregnenolone 3-acylate (XI). This may be accomplished in several ways, e.g., by treatment with refluxing organic bases such as pyridine or collidine, or by treatment with lithium chloride and lithium carbonate in dimethylformamide solution. The latter method is preferred.

The 17α-bromo compound is dissolved in about 8–10 volumes of dimethylformamide and 0.1 part of lithium chloride and about 0.3 part of lithium carbonate added. The stirred mixture is heated at 95–100° C. for 2–3 hours. Care must be taken in that the reaction is exothermic from about 80 C. and above; thus the temperature of the mixture must be watched carefully during the heating period and not allowed to exceed about 100° C. After the heating period is finished, the mixture is cooled to below 50° C. and slowly diluted with stirring with about five volumes of water. The pH is adjusted to ca. 6.0 with 10% aqueous hydrochloric acid, the suspension cooled to about 15° C. and filtered. The residue is washed thoroughly with water and dried to give the crude 16-alkyl-16-dehydropregnenolone 3-acylate (XI) which is about 60–70% pure by ultraviolet analysis. The substantially pure product may be obtained by recrystallization, e.g., from methanol, or by chromatography over acid-washed alumina.

Example 1

*Grignard methylation and enol acetylation of 16-dehydropregnenolone acetate* (I).—A mixture of 675 ml. of 3 M methyl magnesium bromide and 5000 ml. of dry tetrahydrofuran was distilled with protection from atmospheric moisture and carbon dioxide. After 3000 ml. of distillate had collected, the remaining solution was cooled to room temperature. A 15 g. portion of finely powered cuprous chloride was added and then, with stirring, a solution of 356.5 g. (1.0 mole) of 16-dehydropregnenolone acetate in 2335 ml. of dry tetrahydrofuran was added over a 20 minute period. The temperature of this reaction mixture rose from 25° C. to 32° C. Stirring was continued for 4 hours allowing the temperature to fall again to about 25° C. The mixture was then cooled to 10° C. and a solution of 145 ml. of acetyl chloride in 1335 ml. of dry tetrahydrofuran added over a 10 minute period with vigorous stirring and maintaining the temperature at less than 25° C. This mixture is stirred at room temperature for 16 hours, cooled to 10–15° C. and 1495 ml. of saturated aqueous ammonium sulfate solution was added cautiously followed by 300 ml. of water. The layers are separated and the aqueous layer extracted thoroughly with ethyl acetate. The combined solvent layers are washed with 3335 ml. of saturated ammonium chloride solution containing 15 g. of sodium thiosulfate, 3335 ml. of 2.5% aqueous sodium bicarbonate solution, twice with 2000 ml. of saturated salt solution, dried and evaporated to dryness in vacuo to give 468 g. of amorphous 16α-methyl-5,17(20)-pregnadiene-3β,20-diol 3β,20-diacetate (VIII).

Example 2

*Bromination of 16α-methyl-5,17(20)-pregnadiene-3β,20-diol 3β,20-diacetate* (VIII).—The 468 g. of crude product above was dissolved in 10.7 liters of glacial acetic acid. To this stirred solution was added a solution of 304.5 g. of bromine in 2140 ml. of glacial acetic acid at room temperature over a one hour period. After stirring for an additional hour, the mixture was slowly diluted with 100 liters of water. The precipitated product was removed by filtration, washed thoroughly with water and dried at room temperature to give 604 g. of crude tribromide (IX), M.P. about 110° C. (dec.), $[\alpha]_D$ −74.9° (chloroform), no absorption in the ultraviolet in region 230–270 mμ.

Example 3

*Debromination of 5α,6β,17α-tribromo-16α-methylpregnane-3β-ol-20-one 3-acylate* (IX).—The 604 g. of crude tribromide product above was dissolved in 9.74 liters of benzene at room temperature and added to a stirred solution of 1970 g. of sodium iodide in 9.74 liters of absolute ethanol. The mixture was stirred at room temperature for 24 hours and then diluted with 20 liters of 2.5% aqueous sodium thiosulfate solution. The organic layer was separated and the aqueous layer extracted twice with 8 and 4 liters of ethyl acetate. The combined solvent layers were washed twice with aqueous salt solution, dried and evaporated in vacuo below 35° C. to a low volume. The syrup was diluted with methanol, concentrated again in vacuo to the point of crystallization and stored at 0–5° C. overnight. The crystalline solid which separated was removed by filtration, washed with a little cold methanol and dried at room temperature to give 290 g. of 17α-bromo-16α-methyl-5-pregnane-3β-ol-20-one 3-acetate (X), M.P. 130° C. (dec.).

The mother liquor of the product above was taken to dryness in vacuo at about 25° C., redissolved in a mixture of 4 liters of benzene and 4 liters of ether. This solution was treated with 900 ml. of 10% sodium bisulfite solution and the two-phase mixture stirred vigorously for one hour. The organic phase was separated, washed twice with 1% aqueous sodium carbonate solution, with water, dried and evaporated in vacuo at about 35° C. to a small volume. Addition of methanol as above gave crystalline solid, 61 g., M.P. 130° C. (dec.), substantially identical to the material prepared above.

Example 4

*Dehydrobromination of 17α-bromo-16α-methyl-5-pregnene-3β-ol-20-one 3-acetate* (X).—To a solution of 351 g. of the 17-monobromide (X) in 3.05 liters of dimethylformamide was added 35.85 g. of lithium chloride and 123.5 g. of lithium carbonate. The mixture was stirred and heated slowly. At about 80° C., heat began to be evolved from the reaction and therefore the external heat source was momentarily removed. When this evolution of heat began to subside, the heat was reapplied and the reaction brought to and held at 95–100° C. for two and one-half hours. The mixture was cooled to 50° C. and 15.25 liters of water added with stirring. The pH was then adjusted to 6.0 by addition of 10% hydrochloric acid. The slurry was cooled to about 15° C., filtered and the residue washed thoroughly with water and dried to give 274 g. of crude 16-methyl-16-dehydropregnenolone acetate, M.P. ca. 140° C., $$\lambda_{max.}^{EtOH} \ 250 \ m\mu, \ \epsilon \ 6{,}400$$

The 274 g. of crude product above was dissolved in 4565 ml. of 1:1 benzene-hexane and the solution placed on a column of 6.85 kilograms of acid-washed alumina. Twenty-one fractions of 4565 ml. each of 1:1 benzene-hexane were taken followed by twenty-six fractions of 100% benzene. Fractions 19–47 were combined, evaporated to dryness and the residue (174 g.) crystallized from acetone to give 127 g. of 16-methyl-16-dehydropregnenolone acetate (XI), M.P. 166–172°, $$\lambda_{max.}^{EtOH} \ 251 \ m\mu, \ \epsilon \ 9000$$

It is to be understood that the invention is not to be limited to the exact details of operation or the exact compounds shown and described as obvious equivalents will be apparent to those skilled in the art and the invention is to be limited only by the scope of the appended claims.

The embodiments of the invention in which an exclusive property or privilege is claimed are defined as follows:

1. A process for preparing steroid compounds of the formula

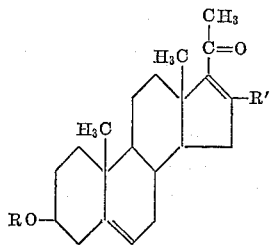

where R is selected from the group consisting of H and

where R''' is an aliphatic hydrocarbon group having from 1 to 11 carbon atoms and R' is an alkyl group having from 1 to 8 carbon atoms, comprising the sequence of steps of
(A) treating a compound of the formula

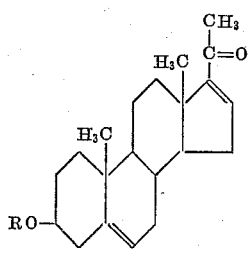

where R is an previously defined, with an alkyl magnesium halide in which the alkyl group has from 1 to 8 carbon atoms followed by treatment with an aliphatic hydrocarbon acylating agent having from 1 to 12 carbon atoms to provide a mixture of the cis and trans forms of

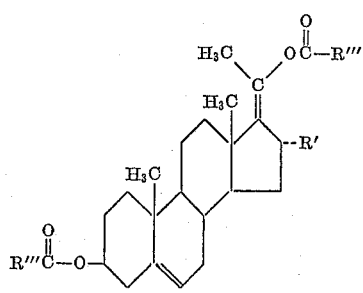

where R' and R''' are as previously defined,
(B) treating the product of (A) with a glacial acetic acid solution of bromine thereby providing

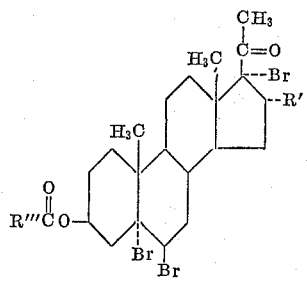

where R' and R''' are as previously defined,
(C) treating the product of (B) with sodium iodide thereby providing

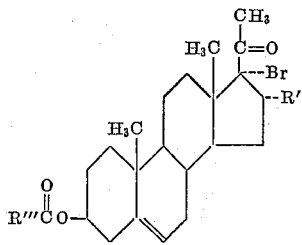

where R' and R''' are as previously defined and,
(D) treating the product of (C) with a solution of lithium chloride and lithium carbonate thereby providing

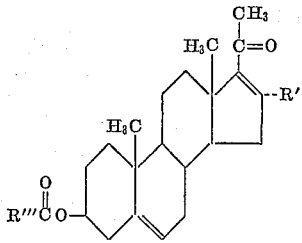

where R' and R''' are as previously defined.
2. A process as defined in claim 1 and further comprising the step of hydrolyzing under acid conditions the product of (D) thereby converting the 3-acylate group to the 3-hydroxy group.

References Cited in the file of this patent
UNITED STATES PATENTS

| | | |
|---|---|---|
| 2,970,157 | Cutler et al. | Jan. 31, 1961 |
| 2,986,572 | Engel | May 30, 1961 |
| 3,057,858 | Djerassi et al. | Oct. 9, 1962 |
| 3,070,614 | Ruggieri | Dec. 25, 1962 |

FOREIGN PATENTS

| | | |
|---|---|---|
| 841,003 | Great Britain | July 13, 1960 |

OTHER REFERENCES

Engel et al.: Can. J. Chem., vol. 38, pages 452–456 (1960).
Mills et al.: J.O.C., vol. 25, pages 1056–1058 (1960).
Ruggieri: It. Farmaco Sci. Ed., vol. XVI, pages 583–590 (August 8, 1961).